(12) United States Patent
Buchwalter et al.

(10) Patent No.: US 6,177,975 B1
(45) Date of Patent: Jan. 23, 2001

(54) PRECISION ALIGNMENT OF PLATES (75) Inventors: Stephen L. Buchwalter, Hopewell Junction, NY (US); David A. Lewis, Glengowrie (AU); Shui-Chih Alan Lien, Briarcliff Manor, NY (US); Sampath Purushothaman, Yorktown Heights, NY (US); John J. Ritsko, Mt. Kisco, NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/559,958

(22) Filed: Apr. 27, 2000

Related U.S. Application Data (62) Division of application No. 09/226,475, filed on Jan. 7, 1999, now Pat. No. 6,104,466.

(51) Int. Cl.$^7$ .............................. G02F 1/13; G02F 1/1333; G02F 1/337
(52) U.S. Cl. .......................... 349/187; 349/161; 349/158; 349/191
(58) Field of Search .................................... 349/187, 191, 349/161, 158, 29, 156

(56) References Cited

U.S. PATENT DOCUMENTS

| 4,043,647 | * | 8/1977 | Oue et al. ............................. 350/320 |
| 5,831,710 | * | 11/1998 | Colgan et al. ........................ 349/156 |
| 6,104,466 | * | 8/2000 | Buchwalter et al. ................. 349/187 |

OTHER PUBLICATIONS

Shaw et al., "Negative Photoresists for Optical Lithography," IBM J. Res. Develop., vol. 41, No. 1/2, pp. 81–94, Jan./Mar. 1997.

Hatzakis et al., "Single–Step Optical Lift–Off Process," IBM J. Res. Develop., vol. 24, No. 4, pp. 452–460, Jul. 1980.

* cited by examiner

Primary Examiner—Kenneth Parker
Assistant Examiner—Mike Qi
(74) Attorney, Agent, or Firm—F. Chau & Associates, LLP; James J. Bitetto (57) ABSTRACT

A system for aligning two plates, in accordance with the present invention, includes a first plate having a lithographically patterned structure formed on a first surface. A second plate also has a lithographically patterned structure formed on a second surface, the first and second surfaces being disposed to face each other. The patterned structures of the plates have corresponding and opposing edges to provide an interference fit between the patterned structures of the first and second plates wherein self-alignment between the first and second plates is realized by engaging the corresponding and opposing edges in the interference fit. A method for aligning two plates includes the steps of providing the system described above, coarsely aligning the plates in a first state which includes an interference between the patterned structures, adjusting at least one of plates to provide a second state having a clearance fit between the patterned structures and moving the plates together and returning to the first state to align the plates relative to each other.

14 Claims, 6 Drawing Sheets

PRECISION ALIGNMENT OF PLATES

This is a divisional of application Ser. No. 09/226,475, filed Jan. 7, 1999, now U.S. Pat. No. 6,104,466.

BACKGROUND OF THE INVENTION

1. Field of the Invention

The present invention relates to precision alignment of plates and, more particularly, to a system and method for aligning and sealing plates relative to one another.

2. Description of the Related Art

In potentially very low cost manufacturing processes for displays, including liquid crystal displays (LCDs), it is desirable to provide precision alignment between plates. For example, in an LCD, a thin film transistor array glass plate and a color filter plate are aligned to a tolerance of within one micron. The alignment process is performed in air using robots and automatic optical alignment. However to achieve the required accuracy, manual intervention and adjustment is required.

The conventional alignment systems are complex and require maintenance and recalibration to ensure appropriate tolerances. Further, the conventional system cannot be implemented in a vaccuum environment which is preferable for display elements.

Therefore, a need exists for a system and method for aligning and sealing plates with high accuracy using lithography. A further need exists for aligning and sealing the plates in a vacuum environment.

SUMMARY OF THE INVENTION

A system for aligning two plates, in accordance with the present invention, includes a first plate having a lithographically patterned structure formed on a first surface. A second plate also has a lithographically patterned structure formed on a second surface, the first and second surfaces being disposed to face each other. The patterned structures of the first and second plates have corresponding and opposing edges to provide an interference fit between the patterned structures of the first and second plates wherein self-alignment between the first and second plates is realized by engaging the corresponding and opposing edges in the interference fit.

In alternate embodiments, the corresponding and opposing edges may include interlocking angled edges. The patterned structures may be continuous about the first and second plates and may form a seal between the first and second plates. The patterned structures may include a metal material. The patterned structures may form a continuous lip about the first and second plates and the corresponding and opposing edges may include corresponding and opposing undercuts in the lips of the first and second plates. The patterned structures preferably include a resist material. The first plate and the second plate may be employed in a liquid crystal display. The first plate and the second plate are preferably aligned to a tolerance of less than one micron.

A method for aligning two plates, in accordance with the present invention includes the steps of providing a first plate having a lithographically patterned structure formed on a first surface and a second plate having a lithographically patterned structure formed on a second surface, the first and second surfaces being disposed to face each other, the patterned structures of the first and second plates having corresponding and opposing edges to provide an interference fit between the patterned structures of the first and second plates, coarsely aligning the first plate with the second plate in a first state wherein the first state includes an interference between the patterned structures, adjusting at least one of the first plate and the second plate to provide a second state having a clearance fit between the patterned structures of the first and second plates and moving the first and second plates together and returning to the first state to align the first and second plates relative to each other.

Another method for aligning two plates includes the steps of providing a first plate having a lithographically patterned structure formed on a first surface and a second plate having a lithographically patterned structure formed on a second surface, the first and second surfaces being disposed to face each other, the patterned structures of the first and second plates having corresponding and opposing edges to provide an interference fit between the patterned structures of the first and second plates, placing the first and second plates in a vacuum environment during alignment, coarsely aligning the first plate with the second plate in a first state wherein the first state includes an interference between the patterned structures, heating the first plate, the first plate having the patterned structure disposed externally relative to the patterned structure of the second plate, the heating providing a second state having a clearance fit between the patterned structures of the first and second plates and moving the first and second plates together and returning to the first state to align the first and second plates relative to each other.

Alternate methods may include the step of coarsely aligning which is performed using an optical alignment process. The patterned structure of the first plate may be exteriorly disposed to the patterned structure of the second plate and the step of adjusting may further include the step of expanding the first plate by heating. The patterned structure of the first plate may be exteriorly disposed to the patterned structure of the second plate and the step of adjusting may further include the step of contracting the second plate by cooling. The steps of both expanding the first plate by heating and contracting the second plate by cooling may be included.

In still other methods, the patterned structures of the first and second plates may each include a continuous lip including undercuts and the method may further include the step of engaging the lips between the first and second plates to form a seal. The method may further include the step of forming a seal between the first and second plates using a sealant. The step of providing a vacuum environment for aligning the first and second plates may also be included. The method may further include the step of forming the patterned structures by employing a resist material.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to precision alignment of plates and, more particularly, to a system and method for aligning an sealing plates relate to one another. The present invention includes alignment structures formed on or etched into plates to provide alignment and sealing between the plates. The plates may be placed in any ambient medium, but are preferably placed in a vacuum environment. The plates are brought into a coarse alignment using, for example, optical alignment techniques. One plate is expanded by, for example, heating the plate. The expansion permits the plates to be brought together without interference. The alignment structures on one plate correspond to the structures on the other plate thereby permitting engagement between the corresponding structures of the plates when the expanded plate is contracted, by for example, cooling.

The corresponding structures include edges which engage during the contraction of the expanded plate thereby providing accurate alignment of the plates. The corresponding structures may include formed or etched structures, preferably formed structures formed by lithography. The structures preferably include angled edges to ensure alignment in at least one dimension. The structures may be continuous about the plate to form a seal thereabout.

Figure 1:
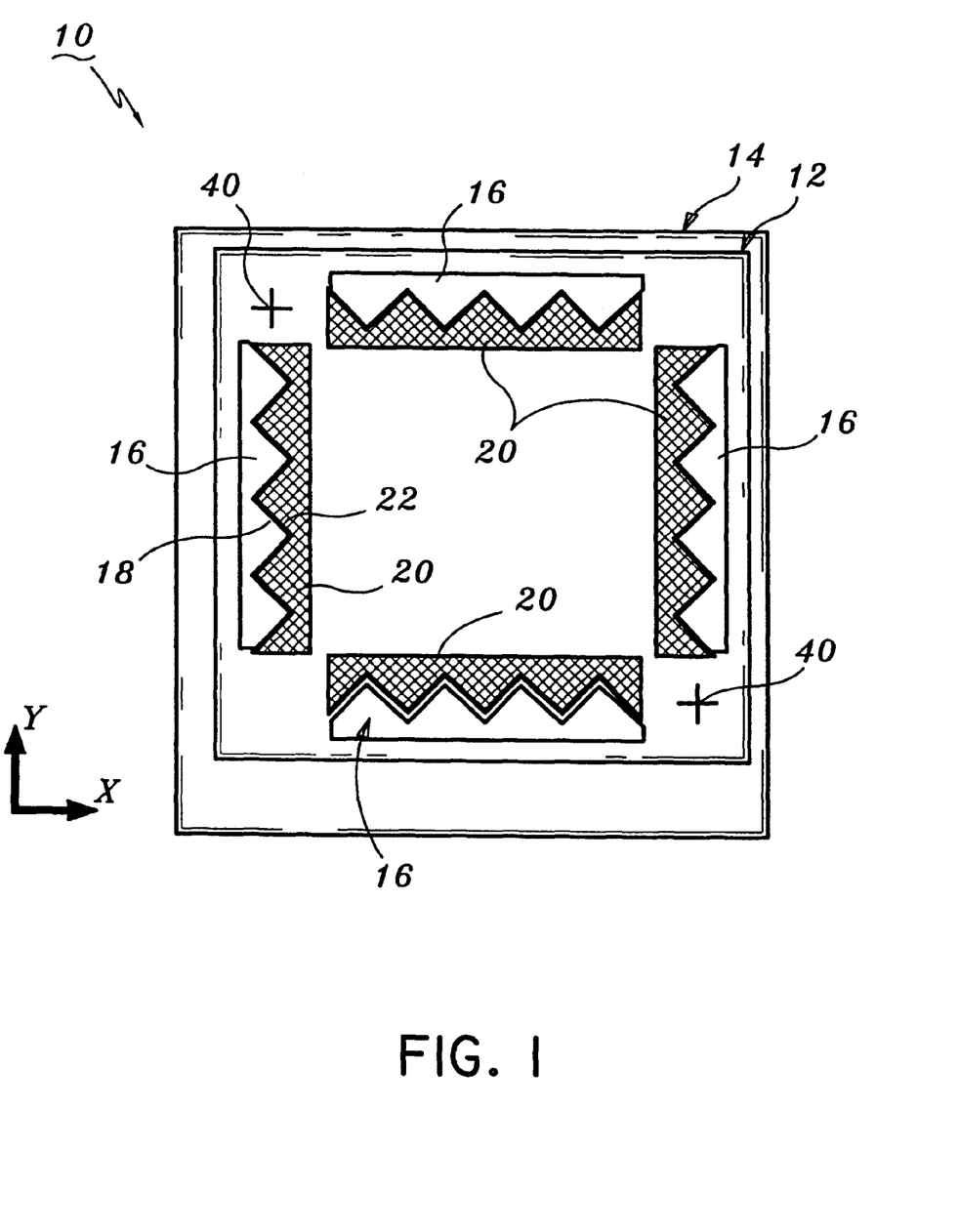
FIG. 1 is a top plan view of a system for aligning plates showing a transparent top plate to view patterned structures in accordance with the present invention.
Figure 2A:
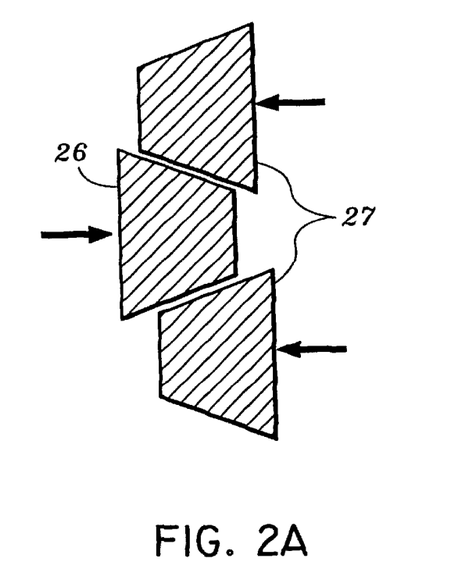
FIGS. 2A–D depict different patterned structures for aligning plates in accordance with the present invention.
Figure 2B:
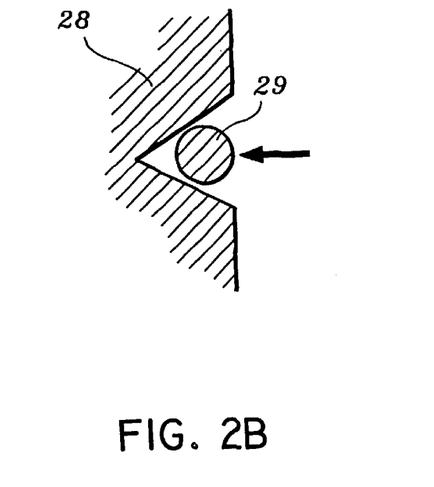
Figure 2C:
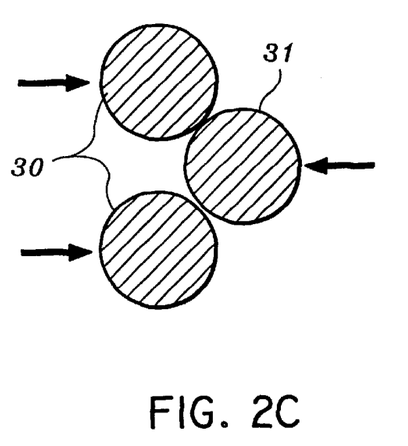
Figure 2D:
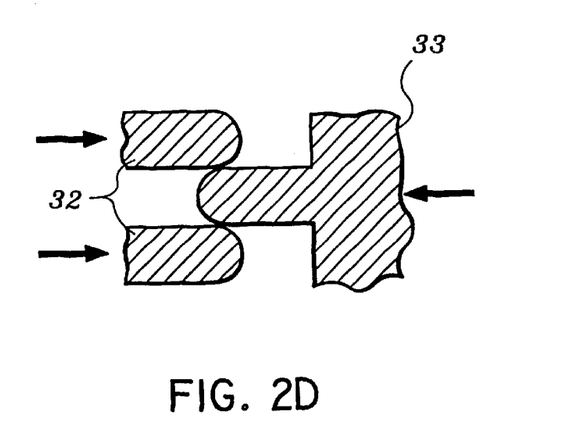

Referring now to the drawings in which like numerals represent the same or similar elements and initially to FIG. 1, a system 10 for aligning two plates 12 and 14 is shown. Plate 12 includes a patterned structure 16 which preferably includes a resist material. Structure 16 is formed using lithography, such as photolithography, for patterning and forming angled edges 18 of structures 16. Plate 14 also includes a patterned structure 20. Structure 20 preferably includes a resist material formed by a lithography process. Angled edges 22 correspond to and oppose edges 18 of structure 16. When engagement occurs between angled edges 18 and 22 alignment of plates 12 and 14 occurs in both the X and Y directions.

Structures 16 and 20 are preferably raised from the surface of plates 12 and 14. Structures 16 and 20 may include other shapes and orientations as well. FIGS. 2A through 2D illustratively show various other types of structures which may be implemented in accordance with the present invention. Structures 26 through 33 have interlocking or engagement features such that if forced to engage corresponding and opposing features cause the alignment of the two plates.

Figure 3:
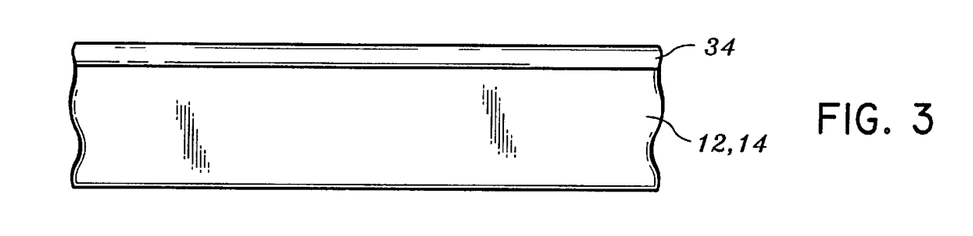
FIG. 3 is a cross-sectional view of a plate having a resist material formed thereon in accordance with the present invention.
Figure 4:
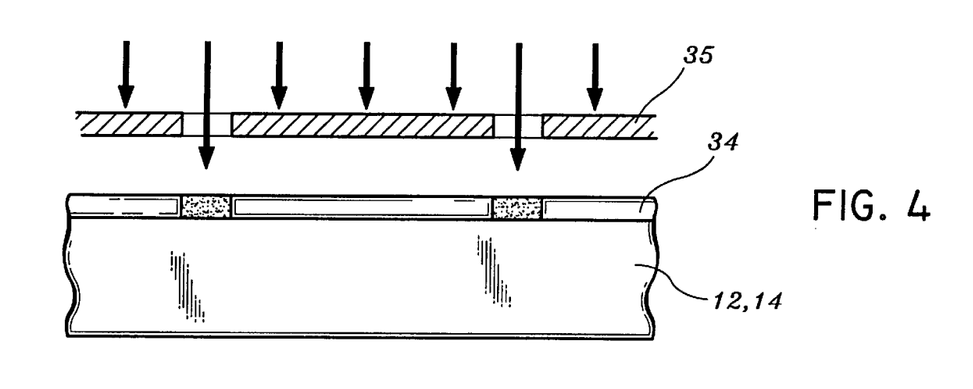
FIG. 4 is a cross-sectional view of the plate of FIG. 3 having the resist material exposed in accordance with the present invention.
Figure 5:
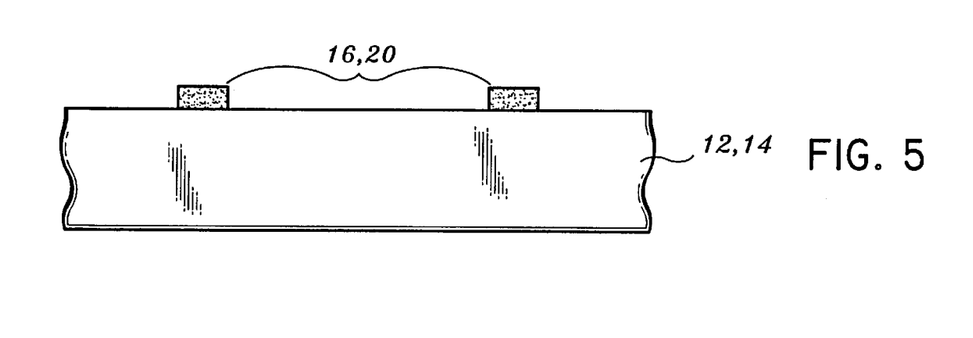
FIG. 5 is a cross-sectional view of the plate of FIG. 4 having the resist material developed in accordance with the present invention.

Referring to FIGS. 3, 4 and 5, structures 16 and 20 are formed using a lithographic process which includes forming a resist layer 34 on each of plates 12 and 14 (FIG. 3). In one embodiment, as shown in FIG. 4, resist layer 34 is exposed to light through a photomask 35 to render portions of resist layer 34 soluble or insoluble depending on the type of resist (positive or negative resist). Resist layer 34 is developed using a developer into patterned structures 16 and 20. The alignment of plates 12 and 14 primarily depend on the accuracy of the lithographic process to define the accuracy of the alignment. Since lithography processing is very accurate, a highly accurate alignment is achieved. Advantageously, alignment tolerances of less than one micron are easily achieved by the present invention.

As shown in FIG. 1, plates 12 and 14 may be used in a plurality of application where alignment of the plates is needed. In one example, plate 14 is a thin film transistor array glass and plate 12 is a color filter glass which are to be aligned to at least a one micron alignment tolerance. In this example, plates 12 and 14 are to have their surfaces separated by a distance of about 5 microns (i.e., a gap). Therefore, structures 16 and 18 need to be about 5 microns in height from the plates. The gap provides a place to fill with liquid crystal for liquid crystal displays.

Figure 6:
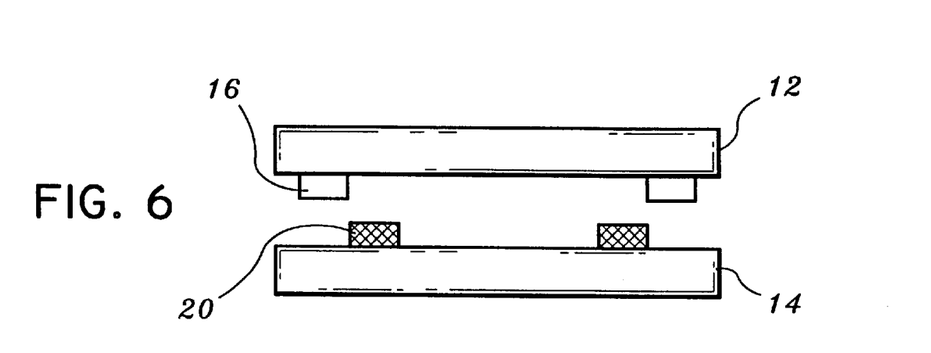
FIG. 6 is a cross-sectional view of two plates showing coarse alignment between the plates in accordance with the present invention.
Figure 7:
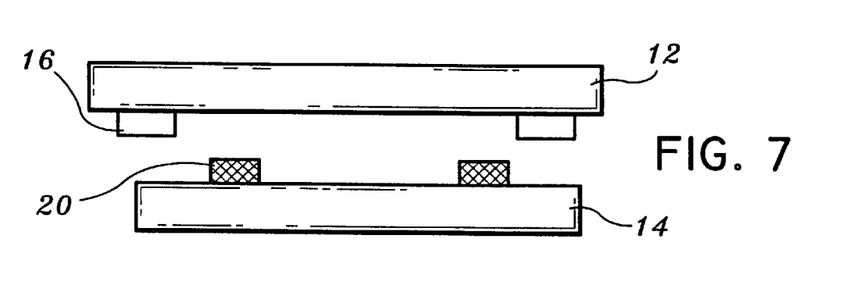
FIG. 7 is a cross-sectional view of the two plates of FIG. 6 showing adjustment to one of the plates by heating/cooling in accordance with the present invention.
Figure 8:
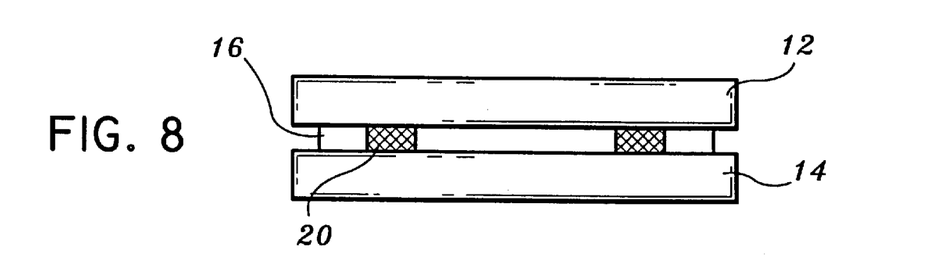
FIG. 8 is a cross-sectional view of the two plates of FIG. 7 showing the plates pushed together and aligned by cooling/heating in accordance with the present invention.

FIGS. 6, 7 and 8 show steps for aligning plates 12 and 14 in accordance with the present invention. Referring to FIG. 6, structures 16 and 20 are formed on plates 12 and 14, respectively. Structures 16 and 20 are preferably formed from a permanent resist material using lithographic techniques known in the art. Structures 16 and 20 may include the structures shown in FIGS. 1 and/or 2 or a combination thereof.

Plate 12 and 14 are brought together into coarse alignment. This may be performed using an optical alignment technique. The optical alignment technique may be performed manually or by an optical device. Optical alignment may be performed by aligning corresponding marks or cross hairs 40 (FIG. 1) on both plates 12 and 14 to be aligned. Other coarse alignment techniques are contemplated, for example, using guides or fixtures to align the plates. The coarse alignment is performed without bring plates 12 and 14 into contact with each other. Plates 12 and 14 are preferable held by electrostatic chucks (not shown) for positioning and adjusting plates 12 and 14 relative to each other. Structures 16 and 20 include a slight interference relative to each other which is exploited to align plates 12 and 14 in later steps.

Referring to FIG. 7, plate 12 includes structures 16 which are exteriorly disposed relative to structures 20 of plate 14. In other words, structures 16 are outside of structures 18. In this way, plate 12 may be expanded in the direction of arrow "A", plate 14 may be contracted in the direction of arrow "B" or a combination of both to permit plates 12 and 14 to be fit together without interference between structure 16 and 18, i.e. a clearance fit. Expanding and contracting are preferably performed by heating and cooling, although other methods may be used, such as stretching or pressing the plates. In the above example, for LCDs, glass plates are preferably used for plates 12 and 14. Glass has a thermal expansion coefficient of about $3.4 \times 10^{-6}/°$ C. For example, a display plate of 300 mm wide will expand by about 10 microns when raised a temperature of 10° C.

Referring to FIG. 8, plates 12 and 14 are brought together in the expanded and/or contracted state such that plates 12 and 14 fit without interference between structures 16 and 18. Plates 12 and 14 are permitted to return to an unexpanded and/or uncontracted state by, for example, cooling and/or heating, thus providing self-aligned plates by engaging structures 16 and structures 18. Plates 12 and 14 are accurately aligned to a tolerance of less than one micron.

In one example, plates 12 and 14 may be sealed using an adhesive or other sealing device. In a preferred embodiment, plates 12 and 14 may be sealed using an ultraviolet light sensitive sealant, a thermal sealant or equivalent. Plates 12 and 14 are preferably aligned in a vacuum environment, however, the aligning process in accordance with the present invention may be performed in any ambient environment. Once sealed, plates 12 and 14 may be removed from the vacuum environment.

Figure 9:
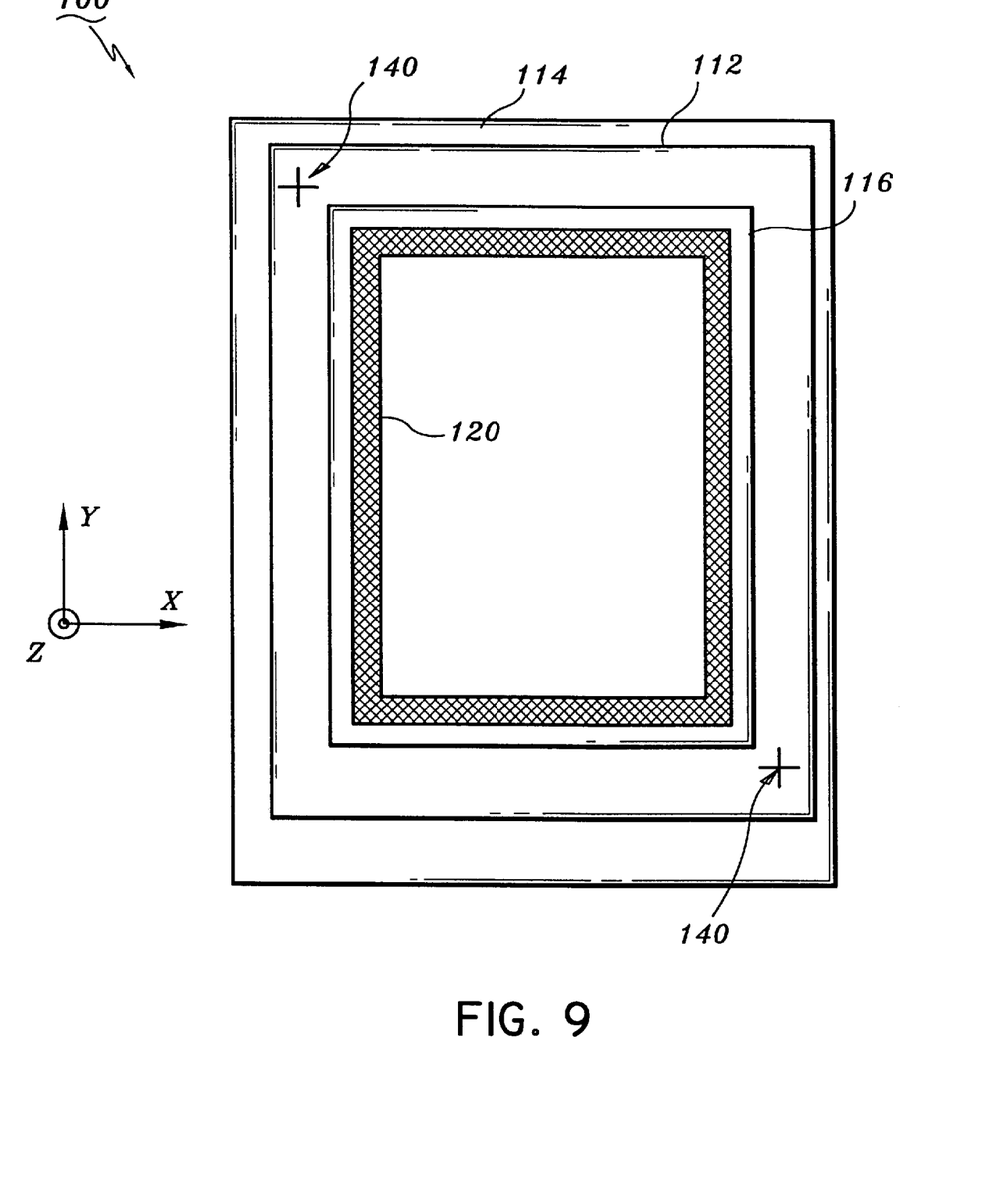
FIG. 9 is a top plan view of a system for aligning and sealing plates showing a transparent top plate to view patterned structures in accordance with the present invention.
Figure 10:
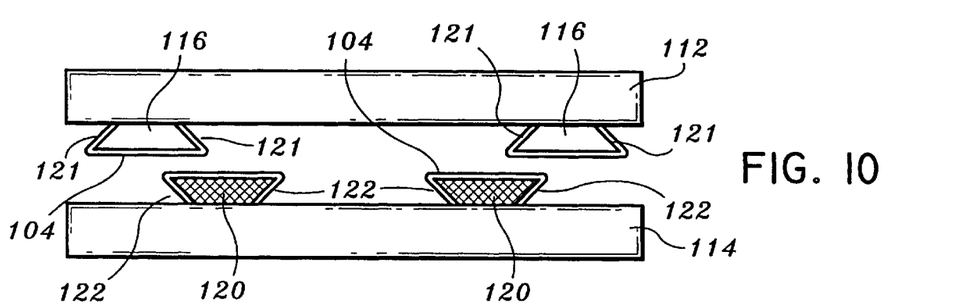
FIG. 10 is a cross-sectional view of two plates showing coarse alignment between the plates in accordance with the present invention.

Referring to FIGS. 9 and 10, a system 100 for aligning and sealing two plates 112 and 114 is shown. Plate 112 includes a patterned structure 116 which may include a resist material; however, it is preferable to include metal materials in structure 116 to reduce permeability of the seal to gases. Structure 116 is formed using lithography, such as photolithography, for patterning and forming angled edges 121 of structures 116. Plate 114 also includes a patterned structure 120. Structure 120 preferably include a resist material formed by a lithography process; however, it is preferable to include metal materials to form structure 120 to reduce permeability of the seal to gases. Structures 116 and 120 are continuous about plates 112 and 114 forming a lip or frame with angled edges 121 and 122. Angled edges 122 correspond to and oppose edges 121 of structure 116. When engagement occurs between angled edges 121 and 122 alignment of plates 112 and 114 occurs in the X, Y and Z directions.

Structures 116 and 120 are formed using a lithographic process which includes forming a resist and/or a metal layer on each of plates 112 and 114. A resist layer, preferably a negative resist, although a positive resist may be used, may be deposited, exposed and developed on plates 112 and 114 as shown in FIGS. 3–5. This process includes the formation of undercuts 102 (FIG. 11) in structures 116 and 118. Undercuts 102 may be formed in, for example, negative resist using standard or alternative resist development chemicals. Undercuts 102 for metal patterns may be formed by depositing a metal as a bilayer, the top layer etching more slowly than a bottom layer during a particular wet or dry etching process.

A plating or deposition process may be includes to deposit a metal layer 104 on structures 116 and 120. Metal layer 104 improves the sealing capability of system 100.

Lithography processing is very accurate. The alignment of plates 112 and 114 primarily depends on the accuracy of the lithographic process to define the accuracy of the alignment. Advantageously, alignment tolerances of less than one micron are easily achieved by the present invention. Structures 116 and 120 may include other shapes and orientations to provide interlocking or engagement features that provide alignment and a seal if forced to engage corresponding and opposing features between the two plates.

As shown in FIG. 9, plates 112 and 114 may be used in a plurality of applications where alignment of the plates is needed. In one example, plate 114 is a thin film transistor array glass and plate 112 is a color filter glass which are to be aligned to at least a one micron alignment tolerance. In this example, plates 112 and 114 are to have their surfaces separated by a distance of about 5 microns (i.e., a gap). Therefore, structures 116 and 120 need to be about 5 microns in height from the plates. The gap provides a place to fill with liquid crystal for liquid crystal displays.

Figure 11:
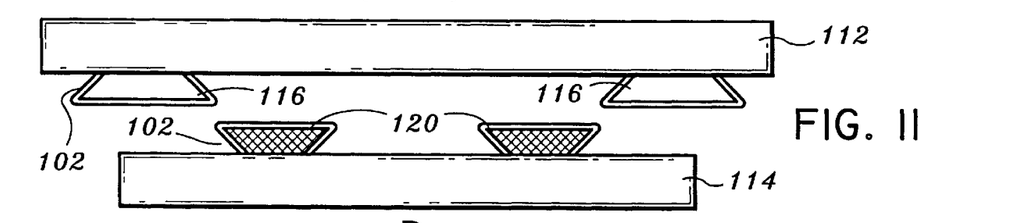
FIG. 11 is a cross-sectional view of the two plates of FIG. 10 showing adjustment to one of the plates by heating/cooling in accordance with the present invention.
Figure 12:
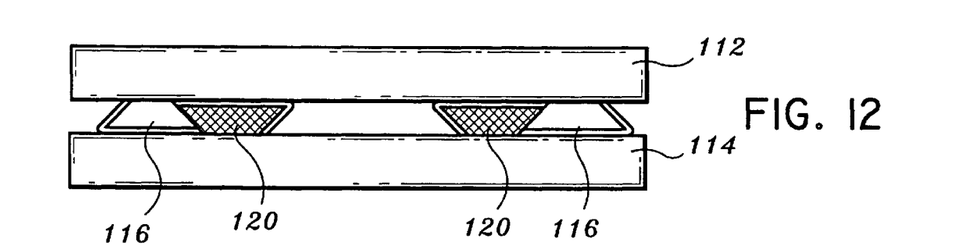
FIG. 12 is a cross-sectional view of the two plates of FIG. 11 showing the plates pushed together and aligned by cooling/heating in accordance with the present invention.

FIGS. 10, 11 and 12 show steps for aligning plates 112 and 114 in accordance with the present invention. Referring to FIG. 10, structures 116 and 120 are formed on plates 112 and 114, respectively. Structures 116 and 118 are preferably formed from a permanent resist material or a metal using lithographic techniques known in the art. Structures 116 and 120 may include the structures shown in FIG. 10 or other equivalent structures.

Plate 112 and 114 are brought together into coarse alignment. This may be performed using an optical alignment technique. The optical alignment technique may be performed manually or by an optical device. Optical alignment may be performed by aligning corresponding marks or cross hairs 140 (FIG. 9) on both plates 112 and 114 to be aligned. Other coarse alignment techniques are contemplated, for example, using guides or fixtures to align the plates. The coarse alignment is performed without bringing plates 112 and 114 into contact with each other. Plates 112 and 114 are preferable held by electrostatic chucks (not shown) for positioning and adjusting plates 112 and 114 relative to each other. Structures 116 and 118 preferably include a slight interference relative to each other such that if brought into contact structures 116 and 118 would contact each other instead on plates 112 and 114.

Referring to FIG. 11, plate 112 includes structure 116 which are exteriorly disposed relative structures 120 which are interiorly disposed. In other words, structures 116 are outside of structures 120. In this way, plate 112 may be expanded in the direction of arrow "C", plate 114 may be contracted in the direction of arrow "D" or a combination of both to permit plates 112 and 114 to be fit together without interference between structure 116 and 118. Expanding and contracting are preferably performed by heating and cooling, although other methods may be used, such as stretching or pressing the plates. In the above example, for LCDs, glass plates are preferably used for plates 112 and 114. Glass has a thermal expansion coefficient of about $3.4 \times 10^{-6}/°$ C. For example, a display plate of 300 mm wide will expand by about 10 microns when raised a temperature of 10° C.

Referring to FIG. 12, plates 112 and 114 are brought together in the expanded and/or contracted state such that plates 112 and 114 fit without interference between structures 116 and 120. Plates 112 and 114 are permitted to return to an unexpanded and/or uncontracted state, by for example, cooling and/or heating thus providing self-aligned plates by engaging structures 116 and structures 120. Further, due to undercuts 102 (FIG. 11), structures 116 and 120 draw plates 112 and 114 together and provide a seal therebetween. Plates 112 and 114 are accurately aligned and sealed to a tolerance of less than one micron.

In one example, plates 112 and 114 may be additionally sealed using an adhesive or other sealing device to provide a redundant seal. In a preferred embodiment, plates 112 and 114 may be sealed using an ultraviolet light sensitive sealant, a thermal sealant or equivalent inside or outside of a vacuum environment. Plates 112 and 114 are preferably aligned in a vacuum environment, however, the aligning process in accordance with the present invention may be performed in any ambient environment. Once sealed, plates 112 and 114 may be removed from the vacuum environment.

Having described preferred embodiments of a system and method for precision alignment of plates (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for aligning two plates comprising the steps of:

provindg a first plate having a lithographically patterned structure formed on a first surface and a second plate having a lithographically patterned structure formed on a second surface, the first and second surfaces being disposed to face each other, the patterned structures of the first and second plates having corresponding and opposing edges to provide an interference fit between the patterned structures of the first and second plates;

coarsely aligning the first plate with the second plate in a first state wherein the first state includes an interference between the patterned structures;

adjusting at least one of the first plate and the second plate to provide a second state having a clearance fit between the patterned structures of the first and second plates; and moving the first and second plates together and returning to the first state to align the first and second plates relative to each other.

2. The method as recited in claim 1, wherein the step of coarsely aligning is performed using an optical alignment process.

3. The method as recited in claim 1, wherein the patterned structure of the first plate is exteriorly disposed to the patterned structure of the second plate and the step of adjusting further comprises the step of expanding the first plate by heating.

4. The method as recited in claim 1, wherein the patterned structure of the first plate is exteriorly disposed to the patterned structure of the second plate and the step of adjusting further comprises the step of contracting the second plate by cooling.

5. The method as recited in claim 1, wherein the patterned structure of the first plate is exteriorly disposed to the patterned structure of the second plate and the step of adjusting further comprises the steps of:

expanding the first plate by heating; and contracting the second plate by cooling.

6. The method as recited in claim 1, wherein the patterned structures of the first and second plates each include a continuous lip including undercuts and the method further comprises the step of engaging the lips between the first and second plates to form a seal.

7. The method as recited in claim 1, further comprises the step of forming a seal between the first and second plates using a sealant.

8. The method as recited in claim 1, further comprises the step of providing a vacuum environment for aligning the first and second plates.

9. The method as recited in claim 1, further comprises the step of forming the patterned structures by employing a resist material.

10. A method for aligning two plates comprising the steps of:

providing a first plate having a lithographically patterned structure formed on a first surface and a second plate having a lithographically patterned structure formed on a second surface, the first and second surfaces being disposed to face each other, the patterned structures of the first and second plates having corresponding and opposing edges to provide an interference fit between the patterned structures of the first and second plates;

placing the first and second plates in a vacuum environment during alignment;

coarsely aligning the first plate with the second plate in a first state wherein the first state includes an interference between the patterned structures;

heating the first plate, the first plate having the patterned structure disposed externally relative to the patterned structure of the second plate, the heating providing a second state having a clearance fit between the patterned structures of the first and second plates; and moving the first and second plates together and returning to the first state to align the first and second plates relative to each other.

11. The method as recited in claim 10, wherein the step of coarsely aligning is performed using an optical alignment process.

12. The method as recited in claim 10, further comprises the step of contracting the second plate by cooling.

13. The method as recited in claim 10, wherein the patterned structures of the first and second plates each include a continuous lip including undercuts and the method further comprises the step of engaging the lips between the first and second plates to form a seal.

14. The method as recited in claim 10, further comprises the step of forming a seal between the first and second plates using a sealant.

* * * * *